US011926387B2

(12) United States Patent
Botha et al.

(10) Patent No.: US 11,926,387 B2
(45) Date of Patent: Mar. 12, 2024

(54) RECUMBENT VEHICLE

(71) Applicant: Barend Wilhelm Botha, Centurion (CA)

(72) Inventors: Barend Wilhelm Botha, Centurion (CA); Barend de Bruyn Botha, Centurion (CA)

(73) Assignee: Barend Wilhelm Botha, Centurion (ZA)

( * ) Notice: Subject to any disclaimer, the term of this patent is extended or adjusted under 35 U.S.C. 154(b) by 744 days.

(21) Appl. No.: 17/047,193

(22) PCT Filed: May 3, 2019

(86) PCT No.: PCT/ZA2019/050023
§ 371 (c)(1),
(2) Date: Oct. 13, 2020

(87) PCT Pub. No.: WO2019/213674
PCT Pub. Date: Nov. 7, 2019

(65) Prior Publication Data
US 2021/0362797 A1   Nov. 25, 2021

(30) Foreign Application Priority Data

May 4, 2018 (ZA) .................................. 2018/02946

(51) Int. Cl.
*B62K 5/05* (2013.01)
*A63B 55/60* (2015.01)
(Continued)

(52) U.S. Cl.
CPC ................ *B62K 5/05* (2013.01); *A63B 55/61* (2015.10); *B62J 1/00* (2013.01); *B62J 11/05* (2020.02);
(Continued)

(58) Field of Classification Search
CPC .. B62K 3/005; B62K 2005/002; A63B 55/61; A63B 2055/601; A63B 2055/615; B62J 11/05
See application file for complete search history.

(56) References Cited

U.S. PATENT DOCUMENTS 3,827,613 A * 8/1974 Meyer ........................ B62J 9/00
224/450
4,548,421 A * 10/1985 Wiener .................. B62K 3/005
280/282

(Continued)

FOREIGN PATENT DOCUMENTS

CN      109250020 A  *  1/2019
CN      111268010 A  *  6/2020  ............... B62H 1/12

(Continued)

OTHER PUBLICATIONS

Switch Vehicles, Inc., "Switch Vehicles, A Different Kind of EV Company Promoting Education and EV Awareness", Web page <https://www.24-7pressrelease.com/press-release/345679/switch-vehicles-a-different-kind-of-ev-company-promoting-education-and-ev-awareness>, 5 pages, retrieved Mar. 27, 2019.

(Continued)

*Primary Examiner* — Barry Gooden, Jr.
(74) *Attorney, Agent, or Firm* — Billion & Armitage

(57) ABSTRACT

The present invention relates to a recumbent vehicle (10), more particularly, it relates to a recreational electrically (38, 40, 42) and/or pedal-powered recumbent vehicle (10), specifically suited for use as a golf cart (100). The recumbent vehicle (10) includes a chassis (12), two front wheels (14A, 14B), a rear wheel (16), a reclined seat (18), a footrest (20) located forwardly of the rotary axis of the front wheel and an unobstructed load bay (22) between the chassis (12), the rear wheel (16) and a backrest of the reclined seat (18).

26 Claims, 6 Drawing Sheets

(51) Int. Cl.

| | | |
|---|---|---|
| *B62J 1/00* | (2006.01) | |
| *B62J 11/05* | (2020.01) | |
| *B62J 25/06* | (2020.01) | |
| *B62K 3/00* | (2006.01) | |
| *B62K 23/02* | (2006.01) | |
| *B62K 25/00* | (2006.01) | |
| *B62L 1/00* | (2006.01) | |
| *B62L 3/04* | (2006.01) | |
| *B62M 3/08* | (2006.01) | |
| *B62M 6/45* | (2010.01) | |
| *B62M 6/90* | (2010.01) | |
| *B62K 5/00* | (2013.01) | |

(52) U.S. Cl.
CPC ............... *B62J 25/06* (2020.02); *B62K 23/02* (2013.01); *B62K 25/00* (2013.01); *B62L 1/00* (2013.01); *B62L 3/04* (2013.01); *B62M 3/08* (2013.01); *B62M 6/45* (2013.01); *B62M 6/90* (2013.01); *A63B 2055/601* (2015.10); *B62K 2005/002* (2013.01)

(56) References Cited

U.S. PATENT DOCUMENTS

| | | | | |
|---|---|---|---|---|
| 4,993,733 A * | 2/1991 | Eilers | ..................... | B62K 3/005 |
| | | | | 280/282 |
| 5,069,469 A * | 12/1991 | Rosengrant | .............. | B62K 5/05 |
| | | | | 280/282 |
| 5,263,732 A * | 11/1993 | Harmeyer | .............. | B62K 3/005 |
| | | | | 280/282 |
| 5,342,074 A * | 8/1994 | Amdahl | ................. | B62K 3/005 |
| | | | | 280/282 |
| 5,544,906 A * | 8/1996 | Clapper | ................. | B63H 16/12 |
| | | | | 280/281.1 |
| 5,568,935 A * | 10/1996 | Mason | ..................... | B62K 5/02 |
| | | | | 280/282 |
| 5,700,228 A * | 12/1997 | James | ...................... | B62M 1/12 |
| | | | | 482/61 |
| 5,732,788 A * | 3/1998 | Brown | ............... | A63B 71/0009 |
| | | | | 180/326 |
| 5,788,254 A | 8/1998 | Davis | | |
| 6,203,043 B1 * | 3/2001 | Lehman | .................. | B62K 5/00 |
| | | | | 280/282 |
| 7,293,623 B2 * | 11/2007 | Berkelmans | ........... | B62K 5/023 |
| | | | | 180/230 |
| 7,866,428 B1 * | 1/2011 | Oliver | ................... | A63B 55/61 |
| | | | | 280/771 |
| 7,954,838 B1 | 6/2011 | Long | | |
| 8,061,465 B2 | 11/2011 | Martino | | |
| 9,821,873 B1 * | 11/2017 | McEvoy | .................. | B62K 5/05 |
| 2002/0014755 A1 * | 2/2002 | Black | ....................... | B62K 5/00 |
| | | | | 280/209 |
| 2004/0026891 A1 * | 2/2004 | Berkelmans | ............. | B62K 3/16 |
| | | | | 280/282 |
| 2004/0144585 A1 * | 7/2004 | Vasser | .................. | B62K 27/006 |
| | | | | 180/206.7 |
| 2004/0245745 A1 | 12/2004 | Vasser | | |
| 2006/0151224 A1 | 7/2006 | Vasser | | |
| 2007/0040350 A1 * | 2/2007 | Wiswell | .................... | B62K 5/05 |
| | | | | 280/282 |
| 2007/0045020 A1 * | 3/2007 | Martino | .................... | B62K 5/05 |
| | | | | 180/210 |
| 2007/0263089 A1 * | 11/2007 | Hess | .................. | A63B 24/0003 |
| | | | | 348/148 |
| 2012/0205170 A1 * | 8/2012 | Adams | .................... | B62K 5/025 |
| | | | | 180/89.1 |
| 2016/0229478 A1 | 8/2016 | Stephani | | |
| 2018/0022411 A1 | 1/2018 | Kistemaker et al. | | |
| 2018/0101998 A1 * | 4/2018 | Pierce | ................... | B60L 3/0015 |
| 2023/0008724 A1 * | 1/2023 | Thompson | ............... | B62M 1/36 |

FOREIGN PATENT DOCUMENTS

| | | | | |
|---|---|---|---|---|
| DE | 9217593 | | 4/1994 | |
| DE | 19511629 A1 * | 10/1996 | ............ | B62K 3/005 |
| DE | 19613858 A1 * | 10/1997 | ............ | B62K 3/005 |
| DE | 19935334 A1 * | 3/2001 | ............ | B62K 3/005 |
| DE | 10054273 A1 * | 5/2002 | ............ | B62K 3/005 |
| DE | 10239357 A1 * | 3/2004 | ............ | B62K 15/00 |
| DE | 102004029388 A1 * | 1/2006 | ............ | B62K 17/00 |
| DE | 202007011609 U1 * | 12/2007 | ............ | B62K 3/005 |
| DE | 102010004701 A1 * | 7/2011 | ............ | B62K 3/005 |
| DE | 102010004702 A1 * | 7/2011 | ............... | B62J 6/02 |
| DE | 102010006378 A1 * | 8/2011 | ............. | B62K 15/00 |
| DE | 102016115442 B3 * | 10/2017 | | |
| KR | 20120019773 A * | 3/2012 | | |
| KR | 20210078673 A * | 6/2021 | | |

OTHER PUBLICATIONS

Robert Duffer, "This electric trike could be the future of mobility", Web page <https://herald-review.com/business/this-electric-trike-could-be-the-future-of-mobility/article_c6f10c73-386b-5c62-a944-ff641e71fe0d.html>, 5 pages, retrieved Oct. 14, 2018, Chicago Tribune.

Gloriast, "Innovative Three-wheeled electric recumbent", Web page <http://itechfuture.com/innovative-three-wheeled-electric-recumbent/>, 9 pages, retrieved Jul. 31, 2016, Future Technology.

Guy Graphics, Inc., "ICE Full Fat Folding Recumbent Trike", Web page <https://www.utahtrikes.com/PROD-11619739.html>, 9 pages, Sep. 27, 2019, retrieved from Internet Archive Wayback Machine <https://web.archive.org/web/20190310085435/http://www.utahtrikes.com/PROD-11619739.html> on Dec. 21, 2020.

Outsider USA, Web page <https://outriderusa.com/collections/horizon>, 4 pages, Mar. 30, 2018, retrieved from Internet Archive Wayback Machine <https://web.archive.org/web/20190330111407/https://outriderusa.com/collections/horizon> on Dec. 18, 2020.

Search report and written opinion dated Jul. 11, 2019 in International Application Serial No. PCT/ZA2019/050023.

* cited by examiner

RECUMBENT VEHICLE

BACKGROUND OF THE INVENTION

THIS invention relates to a recumbent vehicle. More particularly, the invention relates to a recreational electrically and/or pedal-powered recumbent vehicle, specifically suited for use as a golf cart.

Electrically power recreational vehicles are well known, with the most popular version thereof being a multi-person cart of the type produced by E-Z-GO and Club Car. This type of cart is mostly used for golfing applications, carrying at least two golfers. Making provision for two golfers makes the cart unnecessarily costly and, from a golf course management point-of-view, inefficient based on it being highly unlikely for the two golfers sharing the cart arriving at the same ball location after each ball strike.

As a result, demand for single-user golf carts has increased significantly, with many new manufacturers having provided one or more possible solutions (e.g. Fairway Rider, Golfboard, the Gohemian Turf Cruiser, Fat Tire Scooter and the Ellwee Quad), all of which seemingly positioning the golfer well above the wheel axles of the vehicle, and locating the bag mount beyond the front or rear axles (i.e. instead of there between). It will be appreciated that as a result, the weight distribution of such vehicles is not optimized, with the raised centre of gravity thereof likely to cause such vehicles to tip over under an aggressive corning manoeuvre, or on a steeply inclined embankment.

It is an object of the present invention to provide a recreational recumbent vehicle that addresses the drawbacks of the existing solutions by lowering the centre of gravity of the vehicle and brings the majority of the weight applied thereto inboard between the front and rear axles.

Reference to the terms substantially horizontal, vertical or parallel will be appreciated to mean exactly horizontal, vertical or parallel, as well as some acceptable variance therefrom of between about 1 to 10 degrees. Reference to the seat of the vehicle being substantially between the rotary axes of the wheels will be appreciated to mean wholly therebetween, as well as to largely therebetween where only about 5 to 10% of the entire length of the seat extends forwardly beyond the front rotary axis of the vehicle.

SUMMARY OF THE INVENTION

According to the invention there is provided a recumbent vehicle including:
- a chassis;
- two front wheels rotatably connected to the chassis near a front end thereof, the front wheels being rotatable about a front rotary axis;
- one or more rear wheels rotatably connected to the chassis near a rear end thereof, the rear wheel being rotatable about a rear rotary axis, wherein the front and the rear rotary axes lie on a substantially horizontal common plane, or respective substantially horizontal and parallel front and rear planes;
- a steering connected to one or more of the front wheels for steering the recumbent vehicle;
- a brake for braking one or more of the wheels;
- a drive for driving one or more of the wheels;
- a seat mounted on the chassis substantially between the first and second rotary axes, the seat having a base and a backrest reclined relative to the respective horizontal plane;
- one or more foot supports located on the chassis forwardly of the front rotary axis, such that the seat and the foot supports lie on opposite sides of the front rotary axis;

characterised in that the recumbent vehicle further includes a load bay defined between:
- the chassis,
- a primary virtual line passing tangentially through the rear wheel at an acute angle, measured between the primary virtual line and the respective horizontal plane, of between 50 and 70 degrees; and
- a secondary virtual line being parallel with the primary virtual line and passing through a rear-most point on the backrest of the seat, wherein the load bay is an unobstructed space therebetween having:
  - (i) a width at least equal to a width of the backrest of the seat;
  - (ii) a depth, as measured perpendicularly between the primary and secondary virtual lines, of between 100 and 800 millimetres; and
  - (iii) a height, as measured along the secondary virtual line from the chassis upwardly of at least 1000 millimetres.

Generally, the depth of the load bay is between about 200 and 600 millimetres, so as to receive an elongate load therein. Typically, the depth of the load bay is between about 350 and 550 millimetres, and further wherein the elongate load is a golf bag with golf clubs stowed therein, such that the recumbent is applicable to use as a golf cart.

Preferably, the load support base rest is located along the chassis: (i) between the backrest of the seat and a front-most extremity of the rear wheel; and (ii) at a height beneath an upper-most extremity of the rear wheel, the load support base rest being adapted to operatively support a base of the elongate load.

The load support base rest and the base of the seat may be aligned with or near the substantially horizontal rear plane such that the driver's and elongate load's centre of gravity is operatively locatable close to the chassis, and between the front and rear wheels.

Generally, the recumbent vehicle includes a load support upper rest located: (i) rearward of the load support base rest; (ii) aligned with or forwardly of the rear rotary axis; and (iii) above the rear wheel, wherein the load support upper rest is adapted to operatively support a side of the elongate load, and further wherein one or both of the load support base rest and the load support upper rest have a strap for operatively strapping the elongate load to the respective load support base and upper rests.

Typically, the load bay is defined between: the chassis; the secondary virtual line; and a tertiary virtual line being parallel with the primary virtual line and spaced forwardly therefrom by a perpendicular distance of between about 90 and 120 millimetres.

Preferably, the chassis is made up of a tubular main frame having a rear wheel boom extending from a rear end thereof on which the rear wheel is axle or hub mounted, and support arms extending laterally from each side of the tubular main frame, nearer a front end thereof, on which the front wheels are axle or hub mounted.

The support arms are generally of a double wishbone suspension configuration, with first ends of upper and lower wishbone support arms being hingedly connected and second ends of the upper and the lower wishbone support arms being pivotally connected to a wheel mount on which each front wheel is rotatably mounted, such that the front wheels are steerable laterally side-to-side about the pivot connection between the second ends of the wishbone support arms and the wheel mounts.

Typically, the steering is made up of at least a pair of steering tie rods, each being pivotally connected at a first end to one of the wheel mounts and pivotally mounted at a second end to a steering linkage, the steering linkage being pivotally mounted to the chassis, the steering tie rods and steering linkage being located beneath the base of the seat.

The steering linkage may be actuated to transmit steering forces to the front wheels by a steering control, connected at one end to the steering linkage and rising upwardly therefrom to a location above the base of the seat for a driver to engage. Preferably, the steering control is made up of a pair of steering posts rising upwardly from each side of the base of the seat, operatively controllable by each of the driver's hands, such that: (i) the front wheels are steerable by imparting opposing back-and-forth movements on the steering posts; and (ii) the driver has easy access to the seat between the steering posts.

Generally, the drive is: (i) a pedal drive with the foot supports being pedals for enabling a driver to deliver power to the pedal drive; (ii) an electric drive with the foot supports being a stationary footrest; or (iii) both a pedal drive and an electric drive.

Typically, the recumbent vehicle includes a brake control for controlling the brake and an accelerator control for controlling the electric drive. In one embodiment, one of the brake and the accelerator controls may be located on or near the footrest with the other of the brake and the accelerator controls located on at least one of the steering posts. In another embodiment, both the brake and the accelerator controls may be located on or near the footrest. In yet a further embodiment, both the brake and the accelerator controls may be located on the steering posts.

Preferably, the brake control is a brake pedal located at or near the stationary footrest, with the accelerator control being a hand or thumb control located on one of the steering posts. More preferably, the recumbent vehicle incudes a park-brake control, wherein the park-brake control is a park-brake pedal located on or near the stationary footrest. Most preferably, the park-brake pedal is located operatively beneath the brake pedal, such that the brake pedal is depressible onto the park-brake pedal thereby to engage the park-brake.

The brake, the park-brake or both typically also act as an electric cut-out brake, which cuts power to the electric drive when the brake and/or park-brake are engaged, ensuring that no power is delivered to the electric drive until the brake pedal and/or park-brake pedal is released.

Generally, the drives power the rear wheel, with the electric drive being an electric hub motor mounted to the rear wheel, or a mid-mounted electric motor delivering drive to the rear wheel by shaft, gears, belt or chain Furthermore, at least an electronic controller and batteries of the electric drive are locatable on the chassis, aligned with or beneath the base of the seat, so as to retain the centre of gravity of the recumbent vehicle low to the ground.

Typically, the recumbent vehicle has forward and reverse directional drive and a selector for selecting such forward or reverse directional drive. In a preferred embodiment, the stationary footrest includes a foot guard extending forwardly thereof for protecting the driver's feet in the event of a front-end impact.

In an alternative embodiment, the positions of the footrest and seat are adjustable relative to one another to accommodate drivers of different heights. The recumbent vehicle may further include shock absorbers at least at: each of the front wheels; the rear wheel thereof; at both the front and the rear wheels; or under-mounted to the seat.

Generally, the recumbent vehicle includes any one or more of a number of optional accessories comprising: cupholders; umbrella holders; golf ball, tee, scorecard, sand, divot repair tool and writing implement holders; mudguards mountable over the wheels; a second seat; a display; a global positioning system tracker; a sunshade canopy; a full frontal fairing; a load base; rear footrests; a tool/load bin; a rear-view mirror; one or more solar panels for charging the batteries, a horn, a seat belt, a headrest for the seat, and head, tail and braking lights.

Typically, the front of the seat is located substantially at or near a vertical plane passing through the front rotary axis such that in use, the driver's bent knees are located substantially over such front rotary axis. Preferably, the stationary footrest is at a height substantially aligned with or beneath the base of the seat.

Where the recumbent vehicle is configured as a two-seater vehicle with the seat being a front seat and the second seat being located rearward thereof, the second seat may comprise a second base mount over the rear wheel. Furthermore, the second seat may further comprise a second backrest extending from its base, the second backrest being the load support upper rest, with the rear footrest mounted on the chassis behind the front seat being the load support base rest.

BRIEF DESCRIPTION OF THE DRAWINGS

The invention will now be described in more detail, by way of example only, with reference to the accompanying drawings in which.

DETAILED DESCRIPTION OF THE DRAWINGS

Figure 1:
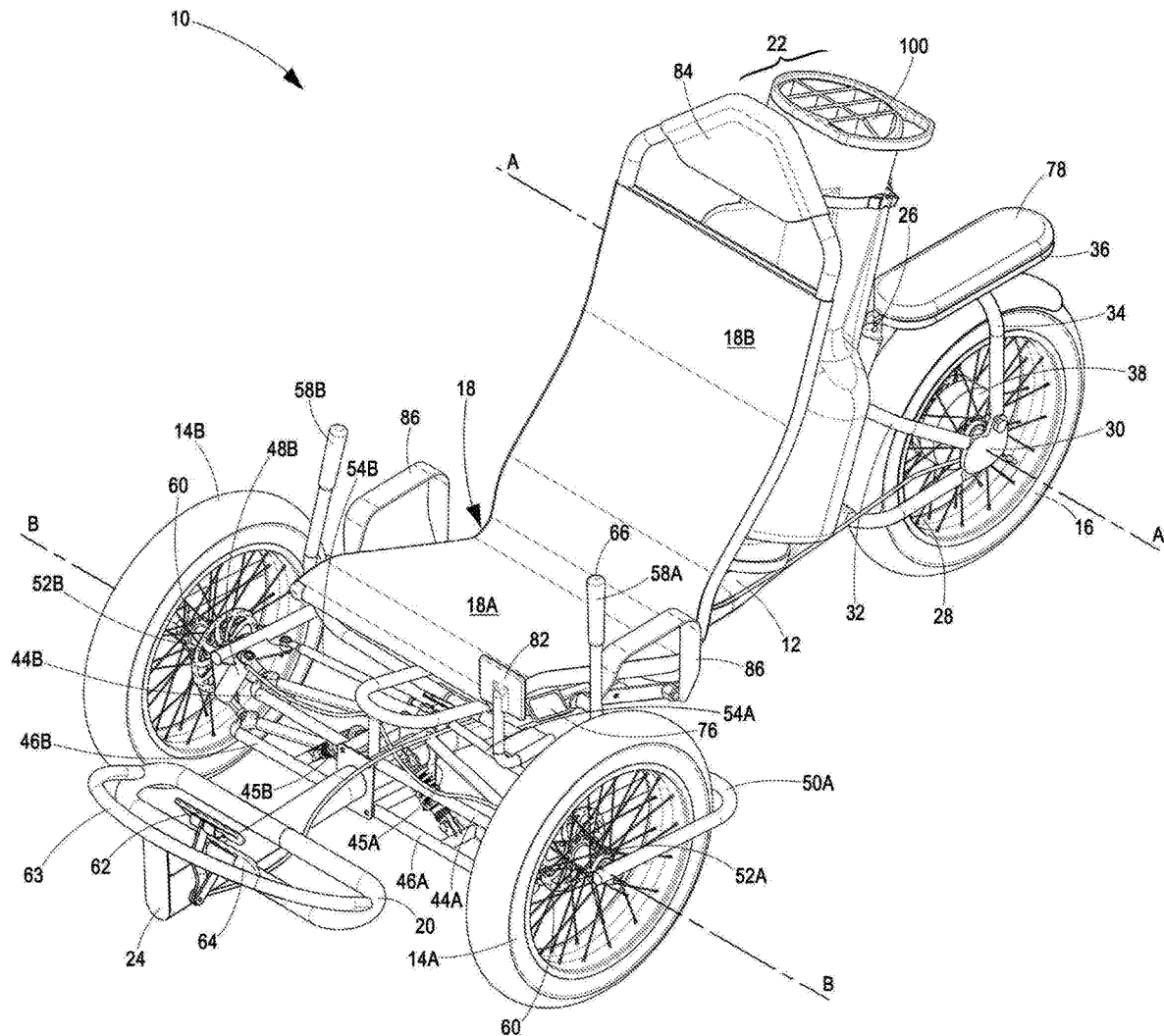
FIG. 1 is a front-end perspective view of a recumbent vehicle in accordance with the present invention, with a golf bag loaded in a load bay area thereof.

A recumbent vehicle according to a preferred embodiment of the invention is designated generally in FIGS. 1 to 4 with reference numeral 10. The recumbent vehicle includes a chassis 12, a pair of front wheels 14A, 14B, a rear wheel 16, a seat 18, a foot support in the form of a stationary footrest 20 and a load bay 22 located between the seat 18 and the rear wheel 16.

Figure 3:
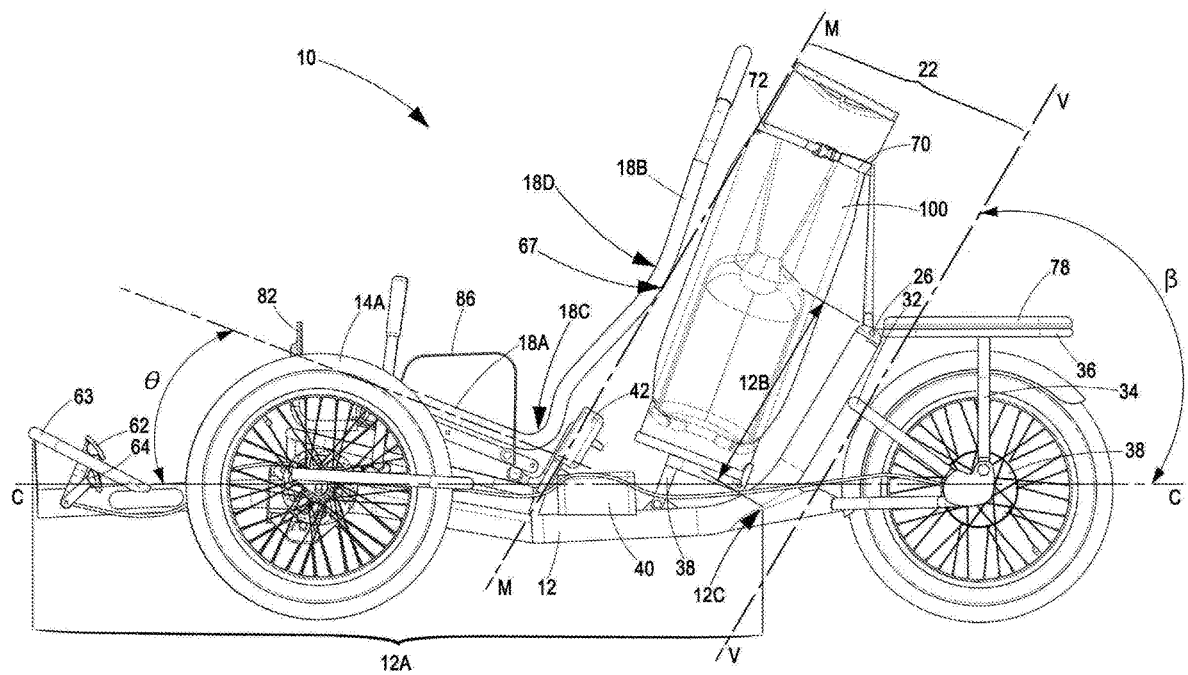
FIG. 3 is a left side view of the recumbent vehicle of FIG. 1.

With reference specifically to FIG. 3, the chassis 12 is made up of a tubular main frame having a substantial L-shape (i.e. angled major and minor legs, although not perpendicular), with a major leg 12A extending between a front end 24 of the chassis 12 and a transition point 12C there along, and an angled minor leg 12B extending between a rear end 26 of the chassis 12 and the transition point 12C.

Figure 5:
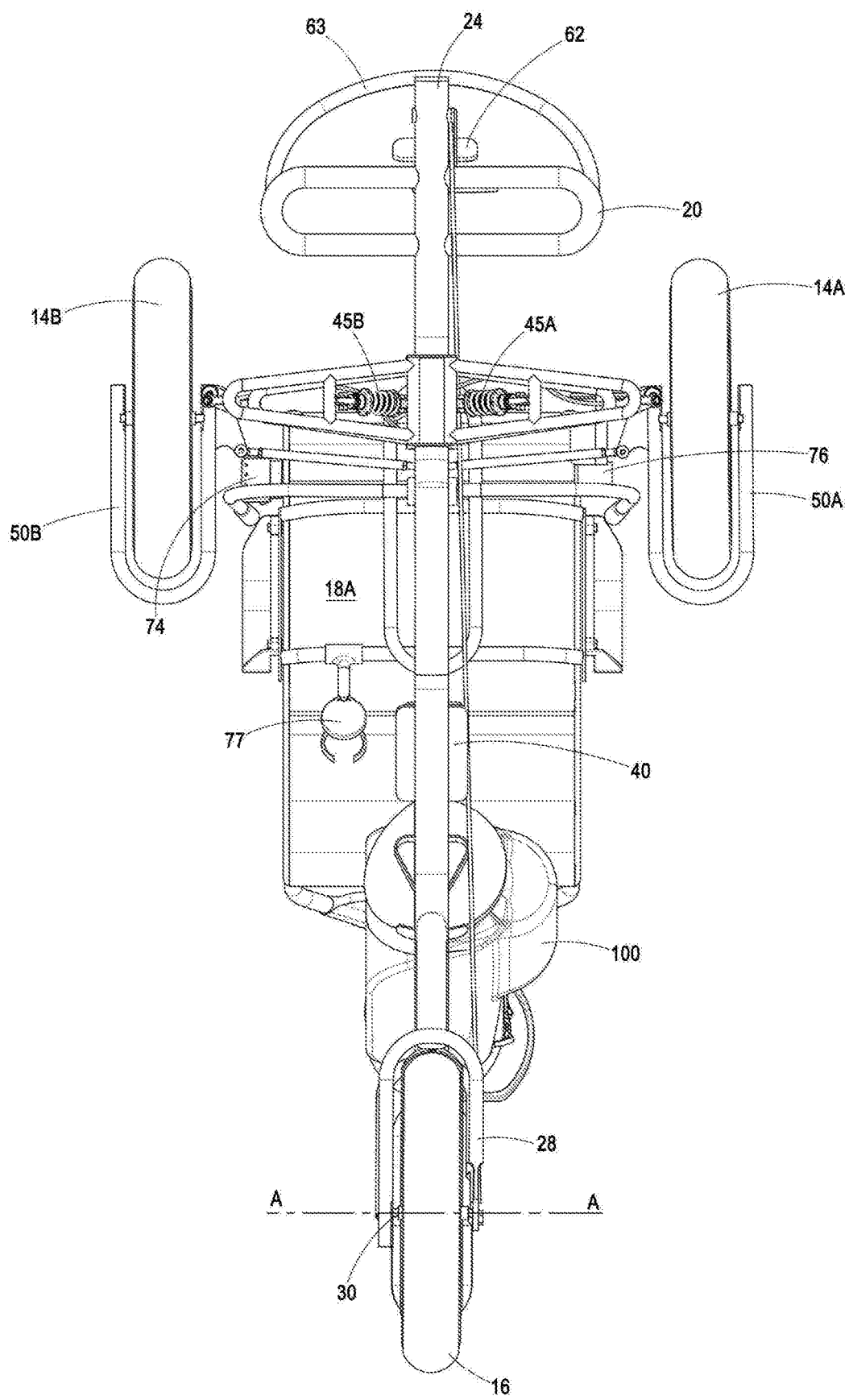
FIG. 5 is a bottom view of the recumbent vehicle of FIG. 1.

With reference also to FIG. 5, a rear wheel boom 28 extends rearward from the chassis 12. The rear wheel boom 28 is in the form of a rear wheel fork, having a rear axle 30 extending there across on which the rear wheel 16 is rotatable about a rear rotary axis A-A, as best illustrated in FIG. 5. The rear wheel fork 28 is supported on the chassis 12 by one or more stays 32, 34, 36 connecting between the chassis 12 and the rear wheel fork 28, with the stay 36 fitted over the rear wheel 16 doubling as a support, which will be described in greater detail later in the description.

Although the rear wheel fork 28 has been illustrated as being fixed to the chassis 12, it will be appreciated that it would be possible to build suspension thereinto by pivotally mounting the rear wheel fork 28 to the chassis 12 and having a shock absorber (not shown) extending therebetween. Furthermore, a single arm boom may replace the rear wheel fork 28, with the rear wheel 16 being hub-supported thereon.

It will be appreciated further that the vehicle 10 is rear wheel drive, including an electric drive, preferably in the form of an electric hub motor 38 for driving the rear wheel 16 directly, and being controlled by an electric controller 40 and batteries 42 mounted on the chassis 12 between the front and rear wheels 14, 16 thereof.

Figure 2:
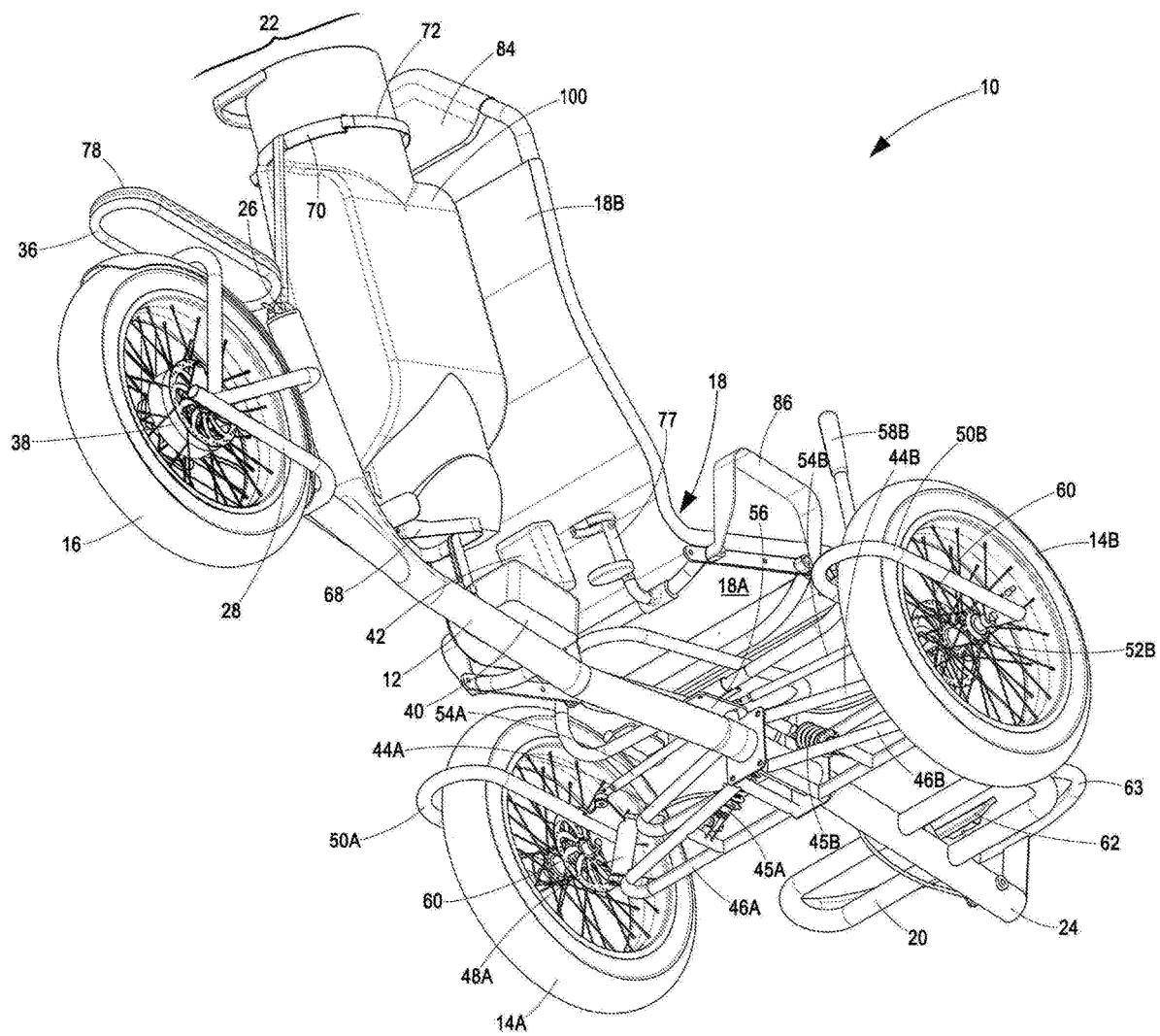
FIG. 2 is a rear-end perspective view of the recumbent vehicle of FIG. 1.

The front wheels 14A, 14B are connected to the chassis 12 by a front double wishbone suspension comprising upper and lower support arms 44A, 44B; 46A, 46B extending laterally between the chassis 12 and each of the front wheels 14A, 14B, together with shock absorbers 45A, 45B extending between each of the lower support arms 46A, 46B and the chassis, as best illustrated in FIGS. 1 and 2.

Each of the upper and lower support arms 44A, 44B; 46A, 46B are hingedly connected at first ends to the chassis 12 such that the upper and lower support arms swing up-and-down relative thereto. Furthermore, each of the upper and lower support arms 44A, 44B; 46A, 46B are pivotally connected at second ends thereof to respective wheel mounts 48A, 48B, such that the front wheels 14A, 14B are steerable laterally side-to-side about such pivot connection.

In the illustrated embodiments, the wheel mounts 48A, 48B further include front wheel forks 50A, 50B each having a front axle 52A, 52B extending there across on which the respective front wheels 14A, 14B are rotatable about a front rotary axis B-B. Although not shown, it will be appreciated that instead of having the front wheels 14 supported on front wheel forks 50, the front wheels 14 would be hub supported directly on the wheel mounts 48.

The vehicle 10 further includes under-seat steering for steering the front wheels 14 thereof. The steering is made up of at least a pair of steering tie rods 54A, 54B each being pivotally connected at first ends to one of the wheel mounts 48A, 48B (for example, via an Ackerman plate) and pivotally connected at second ends to a steering linkage 56, which steering linkage 56 is being pivotally mounted to the chassis 12 beneath the seat 18.

Fixedly connected to the steering linkage 56 are a pair of substantially L-shaped steering posts 58A, 58B, with minor legs thereof connected under-seat to the steering linkage 56 with major legs thereof rising upwardly therefrom on either side of the seat 18. It will be appreciated that in use, the imparting of opposing back-and-forth movements on the steering posts 58 will cause the front wheels 14 to steer left and right. Furthermore, with the steering posts 58 rising on each side of the seat 18, a driver is provided with easy access in and out of the seat 18.

The vehicle 10 further includes brakes 60, in the form of disc brakes at least on the front wheels 14. Although it is possible to have a brake control, for controlling the braking of the disc brakes 60, located on one or more of the steering posts 58A, 58B, it is preferable from weight distribution, driver comfort and ease of operation points of views for the brake control to be a foot-operated brake pedal 62, mounted on the stationary footrest 20 that, relative to the seat 18, lies on an opposite side of the front rotary axis B-B of the front wheel 14, more particularly forwardly of the forward-most extremity of the front wheel 14. It will be appreciated that the stationary footrest 20 includes a foot guard 63 looped forwardly thereof to protect foot injuries in the event of frontal impact.

The vehicle 10 also includes a park-brake to prevent any movement of the vehicle 10 when parked. A foot-operated park-brake pedal 64, also mounted on the stationary footrest 20, preferably controls the park-brake. More preferably, the foot-operated park-brake pedal 64 is positioned beneath the foot-operated brake pedal 62 such that the brake pedal 62 is depressible onto the park-brake pedal 64 thereby to engage the park-brake.

The brake, the park-brake or both may act as an electric cut-out brake, which cuts power to the electric hub motor 38 when the brake and/or park-brake are engaged, ensuring that no power is delivered to the electric hub motor 38 until the brake pedal 63 and/or park-brake pedal 64 is released. This is a very important feature, particularly when getting in and out of the vehicle 10. Once engaged, getting out becomes easy, with potential runaway of the vehicle 10 near eliminated.

The recumbent vehicle 10 further includes an accelerator control for controlling power output to the electric hub motor 38. Although it is possible to have an accelerator control located on the stationary footrest 20, it is preferable from weight distribution, driver comfort and ease of operation points of views for the accelerator control to be a hand-operated accelerator control, specifically a thumb accelerator 66, mounted on one of the steering posts 58A.

It is envisaged that the recumbent vehicle 10 will be fitted with 20 inch diameter, 4 inch fat wheels such that the front and rear rotary axes A-A, B-B lie on a substantially horizontal common plane C-C about 250 millimetres from a ground level on which the vehicle 10 is operatively supportable. It will be appreciated that the front and rear rotary axes A-A, B-B may also be configured to lie on individual substantially horizontal and parallel front and rear planes where, for example, the chassis 12 supports one axle higher than the other, or where differently sized wheels are fitted front and rear.

The seat 18 is an ergonomically design moulded or canvas seat made up of a base 18A and a reclined backrest 18B. With reference specifically to FIG. 3, the backrest of the seat 18 comprises a lower concave formation 18C for supporting a sacrum area of the driver, and an upper concave formation 18D for supporting a thoracic area of the driver.

Preferably, the recline of the backrest 18B of the seat 18 is such that an acute angle measured between the horizontal plane C-C and a backrest reference plane (not shown, but passing tangentially through the lower and upper concave formations 18C, 18D) is between about 50 and 80 degrees. Most preferably, such acute angle is between 64 and 74 degrees. The base 18A is preferably also angled relative to the substantially horizontal common plane C-C by an acute angle θ of between about 13 and 25 degrees.

The seat 18 is ideally located between the front and rear rotary axes A-A, B-B and as low to the chassis 12 as possible. This ensures that the driver's weight is distributed efficiently between the front and rear wheels 14, 16 and as low to the ground as possible.

The load bay 22, located between the seat 18 and the rear wheel 16, is the main features of the invention, which enables it to be applied to many different recreational uses such as a single-user golf cart. Specifically, and with reference to FIG. 3, the load bay 22 is defined between the chassis 12, a primary virtual line V-V and a secondary virtual line M-M.

The primary virtual line V-V passes tangentially through the rear wheel 16 at an acute angle β, measured between the primary virtual line and the horizontal plane C-C, of between about 50 and 70 degrees, but preferably between about 50 and 60 degrees.

The secondary virtual line M-M is parallel with the primary virtual line V-V and passes through a rear-most convex point 67 on the backrest 18B of the seat 18.

Figure 4:
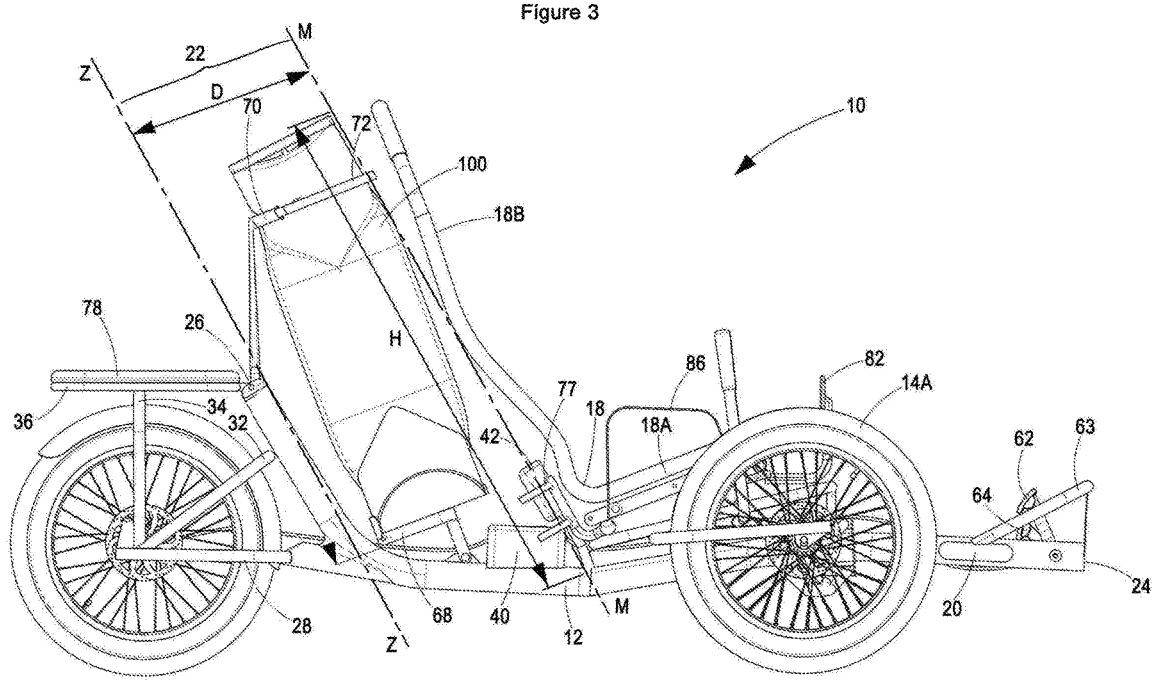
FIG. 4 is a right side view of the recumbent vehicle of FIG. 1.
Figure 6:
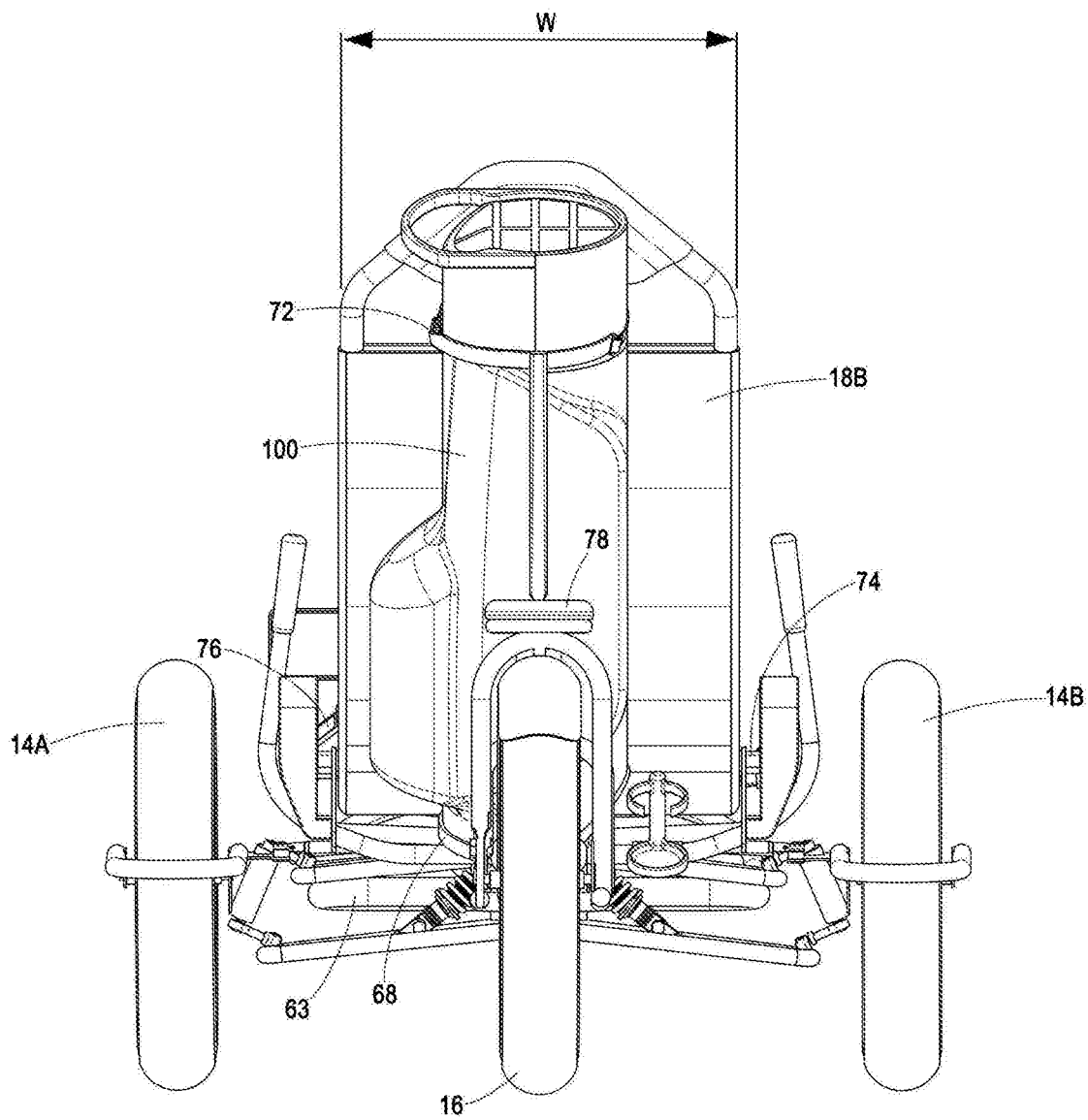
FIG. 6 is a rear view of the recumbent vehicle of FIG. 1.

With reference to FIGS. 4 to 6, the load bay 22 is designed to be an unobstructed space behind the seat 18, having a volume at least sufficiently large enough to carry a golf bag 100 therein, or other load, with a width dimension "W" at least equal to the width of the backrest 18A of the seat (approximately at least 400 millimetres), a height "H", as measured upwardly from the chassis 12 along the secondary virtual line M-M, of at least 1000 millimetres, and a depth "D", as measured perpendicularly between the primary and secondary virtual lines V-V, M-M, of between 100 and 800 millimetres. More preferably, the depth "D" is between about 200 and 600 millimetres. Most preferably, the depth "D" is between about 350 and 550 millimetres.

More specifically, and with reference to FIG. 4, the load bay 22 is defined between the chassis 12, the secondary virtual line M-M and a tertiary virtual line Z-Z, being parallel with the primary virtual line V-V and spaced forwardly therefrom by a perpendicular distance of between about 90 and 120 millimetres.

The load support base rest 68 is located along the chassis 12 between the backrest 18B of the seat 18 and a front-most extremity of the rear wheel 16. Furthermore, the load support base rest 68 is positioned at a height on the chassis 12 being lower than an upper-most extremity of the rear wheel 16, but more particularly at or near the substantially horizontal common plane C-C passing through the front and rear rotary axes A-A, B-B, thereby to position the weight of the golf bag 100 between the front and rear wheels 14, 16 and as low to the ground as possible.

Within the load bay 22, the load support base rest 68 supports the weight of the load 100 (e.g. the golf bag) together with a load support upper rest 70 located above the rear wheel 16, rearward of the load support base rest 68 and aligned with or forwardly of the rear rotary axis A-A. The load support upper rest 70 is adapted to operatively support a side of the golf bag 100. At least the load support upper rest 70 includes a strap 72 for operatively strapping the golf bag 100 thereto.

Figure 7:
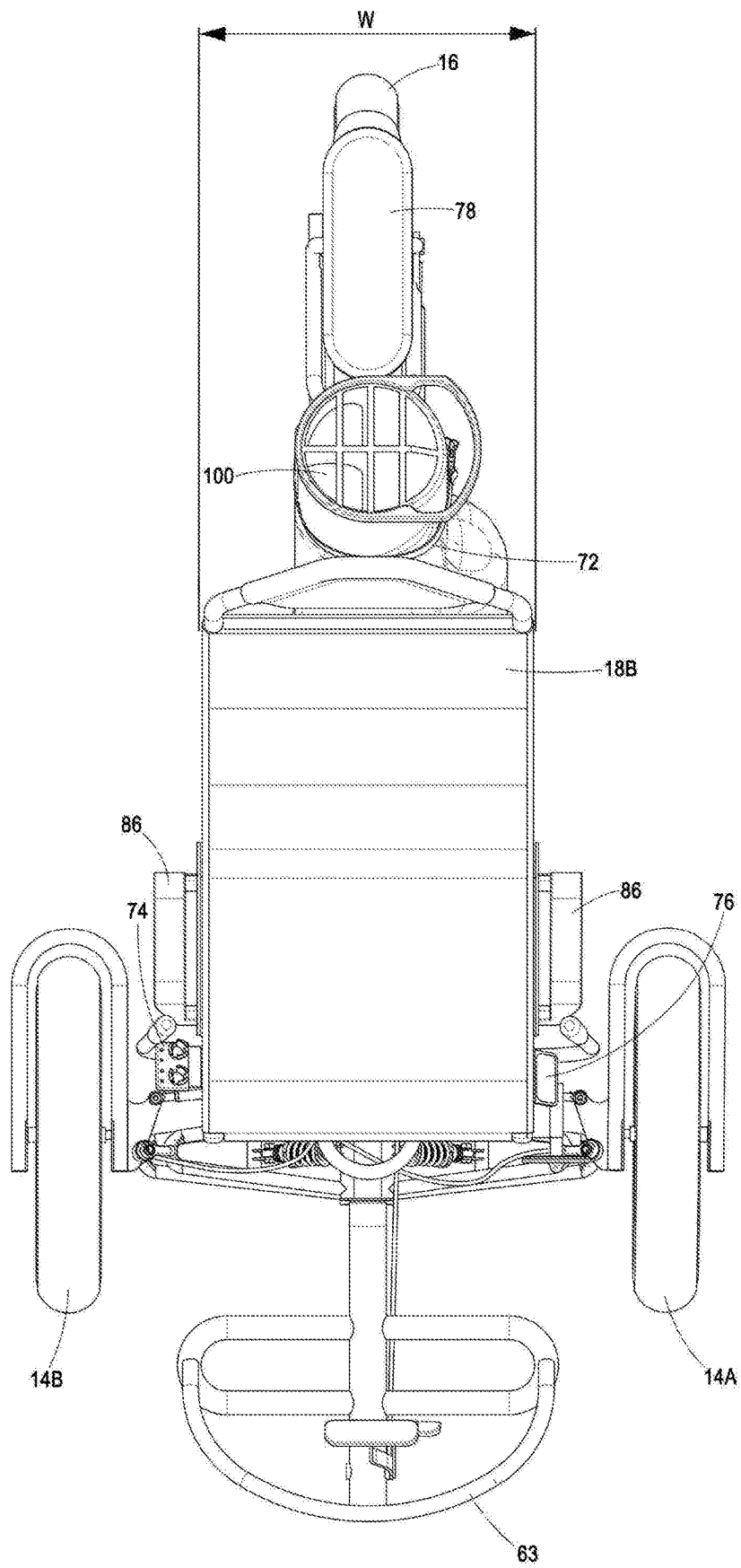
FIG. 7 is a top view of the recumbent vehicle of FIG. 1.

In use as a golf cart, and as best illustrated in FIGS. 5 to 7, the vehicle 10 includes accessories such as a golf tee and ball mount 74 located on one side of the seat 18, and a display 76 on an opposite side of the seat 18, for displaying vehicle information (e.g. status of batteries) or, when connected to a GPS tracking system, how far the vehicle 10 is from a particular golf hole. For its application as a golf cart, the vehicle 10 can also include cup/bottle holders 77, a bench-like cushioned seat 78 over the horizontal stay 36, an umbrella holder (not shown) and at least a small shading canopy (not shown) locatable over the driver's head. It will be appreciated that the shading canopy can be outfitted with photovoltaic panels to supply energy to the batteries. The batteries can further be recharged by a regenerative braking system.

The vehicle 10 may also be outfitted with the following further standard or optional extras:
front wheel mudguards (not shown)
rear wheel mudguard 80;
a full frontal transparent or translucent fairing (not shown) for protecting the driver against weather, sand, sea spray, bugs and general wind under high speed conditions, as well as aerodynamically reducing drag to extend the travel range of the batteries;
in replacement of the golf bag support 68, 70: a load base (e.g. for carrying a cooler box); a load bin extending from the load bay area over and above the rear wheel (e.g. for use in golf cart maintenance and green keeper vehicles); or a second recumbent seat having a second base thereof mounted over the rear wheel and the second backrest thereof extending rearward thereof, with the feet of a user seated in the second seat being supportable by a second footrest positioned otherwise at or near where the load support base rest 68 is mounted on the chassis 12;
a rear-view mirror 82;
seat belts (not shown);
the footrest 20 being supported on the chassis 12 on a telescopic mounting (not shown) thereby enabling relative adjustment of the positions of the footrest 20 and seat 18;
a pedal drive (not shown), in substitution of or supplemental to the electric drive;
shock absorbers (not shown) beneath the seat 18;
a headrest 84 for the seat 18;
a lockable/removable battery enclosure;
armrests 86 to assist the driver with climbing in and out of the vehicle 10;
a reverse drive, and reverse drive selector (not shown); and
head, tail and braking lights (not shown).

It will be appreciated that the list above does not represent an exhaustive list of the extras that the vehicle 10 can be outfitted with.

With the design of the vehicle 10 enabling containment of the weight of driver, steering, batteries and load in the load bay 22 as low to the ground as possible, it will be appreciated that the centre of gravity thereof is ideally positioned. Together with the majority of the weight being contained inboard of the front and rear rotary axes A-A, B-B, and more specifically within the tipping lines defined by lines passing through the wheel centres to form a triangle and as viewed in plan, it will be further appreciated that the handling of the vehicle 10, at least in comparison to existing golf carts available on the market today, is far superior. Its simple and compact design also enables the vehicle 10 to be produced very economically, as well as with a lightweight construction for improved transportability and storage.

Golf course testing of prototype version of the vehicle 10 using lithium ion batteries confirmed much of the theory from which the vehicle 10 was designed. The vehicle 10 is safe to use, does not damage the golf course and has sufficient battery range to last a full round of golf.

At 50 kilograms in weight, the prototype is easy to handle and transport. Also, the vehicle 10 can be stored upright (e.g. standing on it front wheels with the rear wheel positioned vertically there above) reducing the footprint the vehicle 10 occupies when not in use. The vehicle 10 has largely been designed using bicycle and e-bike components, making replacement of such parts accessible and affordable.

Although the invention has been described above with reference to preferred embodiments, it will be appreciated that many modifications or variations of the invention are possible without departing from the spirit or scope of the invention.

For example, instead of an electric hub motor 38, the vehicle 10 could be powered by a mid-mounted electric motor with drive being transmitted to the rear wheel via shaft, gears, belt or chain. Also, instead of mounting the front wheels 14 on individual axles 52A, 52B, the front wheels may be mounted on a single fixed axle.

The brake system preferably comprises a mechanism for balancing braking forces to each of the front wheels 14A, 14B so as to ensure straight-line braking, particularly for inexperienced drivers.

The vehicle 10, particularly for the rental market, includes an activation control system that prevents unauthorised use of thereof. For example, the vehicle 10 may be fitted with an electronic receiver (e.g. a RFID card or tag reader) that cuts power from the electric controller 40 to the electric hub motor 28 until the electronic receiver receives an authenticated activation signal from a activation member (e.g. an RFID card or tag).

The RFID cards or tags may be programmable, through custom software, to program thereinto the parameters of activation—such as duration of activation, details of the driver and more.

Usage (i.e. demand and abuse) and location of the vehicles 10 are monitored and logged by the receiver and/or the GPS tracker to: allow real-time control override (i.e. limited accelerator control in designated areas like near greens, or total deactivation of accelerator when vehicle 10 moves passed certain boundaries to curb theft); and later analysis of data (e.g. overall utilization, abuse, time of usage, course location).

The invention claimed is:

1. A recumbent vehicle including:
    a chassis;
    two front wheels rotatably connected to the chassis near a front end thereof, the two front wheels being rotatable about a front rotary axis;
    at least one rear wheel rotatably connected to the chassis near a rear end thereof, the at least one rear wheel being rotatable about a rear rotary axis, wherein a substantially horizontal plane passes through at least one of the front rotary axis and the rear rotary axis;
    a steering connected to one or more of the front wheels for steering the recumbent vehicle;
    a brake for braking one or more of the wheels;
    a drive for driving one or more of the wheels;
    a seat mounted on the chassis substantially between the front and the rear rotary axes, the seat having a base and a backrest reclined relative to the substantially horizontal plane;
    one or more foot supports located on the chassis forwardly of the front rotary axis, such that the seat and the one or more foot supports lie on opposite sides of the front rotary axis;
    a load bay defined between:
        the chassis,
        a primary virtual line passing tangentially through the rear wheel at an acute angle, measured between the primary virtual line and the substantially horizontal plane, of between 50 and 70 degrees; and
        a secondary virtual line being parallel with the primary virtual line and passing through a rear-most point on the backrest of the seat, wherein the load bay is positioned entirely between the secondary virtual line and the primary virtual line and includes:
            (i) a width at least equal to a width of the backrest of the seat;
            (ii) a depth, as measured perpendicularly between the primary and secondary virtual lines, of between 100 and 800 millimetres;
            (iii) a height, as measured along the secondary virtual line from the chassis upwardly of at least 1000 millimetres; and,
            (iv) a load support base rest located along the chassis: (a) between the backrest of the seat and a front-most extremity of the rear wheel; and (b) at a height beneath an upper-most extremity of the rear wheel, the load support base rest being adapted to operatively support a base of an elongate load.

2. The recumbent vehicle according to claim 1, wherein the depth of the load bay is between about 200 and 600 millimetres.

3. The recumbent vehicle according to claim 2, wherein the depth of the load bay is between about 350 and 550 millimetres, and further wherein the elongate load is a golf bag with golf clubs stowed therein.

4. The recumbent vehicle according to claim 1, wherein the load bay includes a load support upper rest and a strap for operatively securing the elongate load to the recumbent vehicle, wherein the load support base and the load support upper rest are positioned between the secondary virtual line and the primary virtual line and entirely between the rear rotary axis and the backrest of the seat.

5. The recumbent vehicle according to claim 4 including a load support upper rest located: (i) rearward of the load support base rest; (ii) aligned with or forwardly of the rear rotary axis; and (iii) above the rear wheel, wherein the load support upper rest is adapted to operatively support a side of the elongate load, and further wherein one or both of the load support base rest and the load support upper rest have a strap for operatively strapping the elongate load to the respective load support base and upper rest.

6. The recumbent vehicle according to claim 5, wherein the load bay is defined between:
    the chassis,
    the secondary virtual line; and
    a tertiary virtual line being parallel with the primary virtual line and spaced forwardly therefrom by a perpendicular distance of between about 90 and 120 millimetres.

7. The recumbent vehicle according to claim 6, wherein the chassis is made up of a tubular main frame having a rear wheel boom extending from a rear end thereof on which the rear wheel is axle is mounted, and support arms extending laterally from each side of the tubular main frame, nearer a front end thereof, on which the front wheels are axle or hub mounted.

8. The recumbent vehicle according to claim 7, wherein the support arms are of a double wishbone suspension configuration, with first ends of upper and lower wishbone support arms being hingedly connected and second ends of the upper and the lower wishbone support arms being pivotally connected to a wheel mount on which each front wheel is rotatably mounted, such that the front wheels are steerable laterally side-to-side about the pivot connection between the second ends of the wishbone support arms and the wheel mounts.

9. The recumbent vehicle according to claim 8, wherein the steering is made up of at least a pair of steering tie rods, each being pivotally connected at a first end to one of the wheel mounts and pivotally mounted at a second end to a steering linkage, the steering linkage being pivotally mounted to the chassis, the steering tie rods and steering linkage being located beneath the base of the seat.

10. The recumbent vehicle according to claim 9, wherein the steering linkage actuated to transmit steering forces to the front wheels by a steering control, connected at one end to the steering linkage and rising upwardly therefrom to a location above the base of the seat for a driver to engage.

11. The recumbent vehicle according to claim 10, wherein the steering control is made up of a pair of steering posts rising upwardly from each side of the base of the seat, operatively controllable by each of the driver's hands, such that:
   (i) the front wheels are steerable by imparting opposing back-and-forth movements on the steering posts; and
   (ii) the driver has easy access to the seat between the steering posts.

12. The recumbent vehicle according to claim 11, wherein the drive is:
   an electric drive with the foot supports being a stationary footrest.

13. The recumbent vehicle according to claim 12 including a brake control for controlling the brake and an accelerator control for controlling the electric drive, wherein:
   (i) one of the brake and the accelerator controls are located on or near the footrest with the other of the brake and the accelerator controls located on at least one of the steering posts;
   (ii) both the brake and the accelerator controls are located on or near the footrest; or
   (iii) both the brake and the accelerator controls are located on the steering posts.

14. The recumbent vehicle according to claim 13, wherein the brake control is a brake pedal located at or near the stationary footrest, with the accelerator control being a hand or thumb control located on one of the steering posts.

15. The recumbent vehicle according to claim 14 including a park-brake control, wherein the park-brake control is a park-brake pedal located on or near the stationary footrest.

16. The recumbent vehicle according to claim 15, wherein the park-brake pedal is located operatively beneath the brake pedal, such that the brake pedal is depressible onto the park-brake pedal thereby to engage the park-brake.

17. The recumbent vehicle according to claim 16, wherein the drive includes the electric drive being an electric hub motor mounted to the rear wheel, or a mid-mounted electric motor delivering drive to the rear wheel by shaft, gears, belt or chain, and further wherein at least an electronic controller and batteries of the electric drive are located on the chassis aligned with or beneath the base of the seat so as to retain a centre of gravity of the recumbent vehicle low to the ground.

18. The recumbent vehicle according to claim 17, wherein the recumbent vehicle has forward and reverse directional drive and a selector for selecting the forward or reverse directional drive required by the driver.

19. The recumbent vehicle according to claim 18, wherein the stationary footrest includes a foot guard extending forwardly thereof for protecting the driver's feet in the event of a front-end impact.

20. The recumbent vehicle according to claim 19, wherein the positions of the footrest and seat are adjustable relative to one another to accommodate driver's of different heights.

21. The recumbent vehicle according to claim 20 including shock absorbers at least at: each of the front wheels.

22. The recumbent vehicle according to claim 21 including any one or more of a number of accessories comprising: umbrella holders; golf ball, tee, scorecard, sand, divot repair tool and writing implement holders; mudguards mountable over the wheels; a display; a global positioning system tracker; a sunshade canopy; a full frontal fairing; a rear-view mirror; one or more solar panels for charging the batteries, a horn, a seat belt, a headrest for the seat, and head, tail and braking lights.

23. The recumbent vehicle according to claim 22, wherein the front of the seat is located substantially at or near a vertical plane passing through the front rotary axis such that in use, the driver's bent knees are located substantially over such front rotary axis.

24. The recumbent vehicle according to claim 23, wherein the stationary footrest is at a height substantially aligned with or beneath the base of the seat.

25. The recumbent vehicle according to claim 24, wherein the brake, park-brake or both acts as an electric cut-out brake for cutting power to the electric drive when the brake and/or park-brake is engaged, ensuring that no power is delivered to the electric drive until the brake and/or park-brake pedal is released.

26. The recumbent vehicle according to claim 25, wherein the backrest of the seat comprises a lower concave formation for supporting a sacrum area of the driver, and an upper concave formation for supporting a thoracic area of the driver, and further wherein a backrest reference plane passing tangentially through such lower and upper concave formations forms an acute angle, measured between the backrest reference plane and the substantially horizontal plane, of between about 50 and 80 degrees.

* * * * *